United States Patent
Sankar et al.

(10) Patent No.: US 10,959,233 B2
(45) Date of Patent: Mar. 23, 2021

(54) METHOD TO ENABLE ITERATIVE PROCESSING AND PERFORM CLOSER TO CONSTRAINED CAPACITY

(71) Applicant: QUALCOMM Incorporated, San Diego, CA (US)

(72) Inventors: Hari Sankar, San Diego, CA (US); Alexei Yurievitch Gorokhov, San Diego, CA (US); Paolo Minero, La Jolla, CA (US); Hobin Kim, San Diego, CA (US); Raghu Challa, San Diego, CA (US); Jing Jiang, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 15/808,637

(22) Filed: Nov. 9, 2017

(65) Prior Publication Data
US 2018/0139758 A1    May 17, 2018

Related U.S. Application Data

(60) Provisional application No. 62/421,352, filed on Nov. 13, 2016.

(51) Int. Cl.
*H04W 72/04* (2009.01)
*H04L 1/00* (2006.01)
(Continued)

(52) U.S. Cl.
CPC ......... *H04W 72/0466* (2013.01); *H04L 1/005* (2013.01); *H04L 1/0023* (2013.01);
(Continued)

(58) Field of Classification Search
CPC ............. H04W 72/0466; H04W 24/02; H04W 72/085; H04W 24/08; H04L 1/0075; H04L 1/005; H04L 1/0023
See application file for complete search history.

(56) References Cited

U.S. PATENT DOCUMENTS 9,048,977 B2 * 6/2015 Ramprashad ......... H04L 1/0003
2005/0210367 A1 * 9/2005 Ashikhmin ........ H03M 13/1105
714/801
(Continued)

OTHER PUBLICATIONS ("EXIT chart-Aided Adaptive coding for multilevel BICM with turbo Equalization in frequency-selective MIMO channels"", IEE transactions on vehicular technology, Shinsuke Ibi, Nov. 2007" (Year: 2007).*
(Continued)

*Primary Examiner* — Hassan Kizou
*Assistant Examiner* — Abdullahi Ahmed
(74) *Attorney, Agent, or Firm* — Linda G. Gunderson; Loza & Loza LLP

(57) ABSTRACT

Systems, methods and apparatus select a code book based on channel conditions and performance of a demodulator or demapper in a wireless receiver. The method may include determining that the receiver in a first wireless communication apparatus is configured for iteratively processing signals received from a channel, selecting a code book for use in communicating over the channel based on conditions affecting transmission of the signals through the channel and performance information associated with a demapper in the receiver, and identifying the selected code book in one or more control channels transmitted to a second wireless communication apparatus.

30 Claims, 10 Drawing Sheets

(51) Int. Cl.
*H04W 24/02* (2009.01)
*H04W 24/08* (2009.01)
*H04W 72/08* (2009.01)

(52) U.S. Cl.
CPC ........... *H04L 1/0075* (2013.01); *H04W 24/02* (2013.01); *H04W 24/08* (2013.01); *H04W 72/085* (2013.01)

(56) References Cited

U.S. PATENT DOCUMENTS

| | | | | |
|---|---|---|---|---|
| 2009/0052907 | A1* | 2/2009 | Batshon | H04L 1/0071 398/182 |
| 2009/0245432 | A1* | 10/2009 | Matsumoto | H04L 25/03171 375/341 |
| 2010/0146365 | A1* | 6/2010 | Yano | H03M 13/255 714/752 |
| 2010/0174965 | A1* | 7/2010 | Sutskover | H03M 13/114 714/752 |
| 2011/0110449 | A1* | 5/2011 | Ramprashad | H04L 1/0017 375/261 |
| 2011/0165846 | A1* | 7/2011 | Zheng | H04B 7/0417 455/67.13 |
| 2014/0140360 | A1* | 5/2014 | Nikopour | H04J 13/00 370/479 |
| 2016/0021663 | A1* | 1/2016 | Takahashi | H04L 1/0071 370/329 |
| 2018/0097555 | A1* | 4/2018 | Nammi | H04B 7/0632 |
| 2018/0270016 | A1* | 9/2018 | Mueck | H03M 13/616 |

OTHER PUBLICATIONS

Ibi S., et al., "EXIT Chart-Aided Adaptive Coding for Multilevel BICM With Turbo Equalization in Frequency-Selective MIMO Channels", IEEE Transactions on Vehicular Technology, IEEE Service Center, Piscataway, NJ, US, vol. 56, No. 6, Nov. 1, 2007 (Nov. 1, 2007), pp. 3757-3769, XP011194731, ISSN: 0018-9545, DOI: 10.1109/TVT.2007.901959.

International Search Report and Written Opinion—PCT/US2017/060992—ISA/EPO—dated Feb. 19, 201 (170843WO).

Matsumoto T., et al., "Adaptive Transmission with Single-Carrier Multilevel BICM", Proceedings of the IEEE, IEEE. New York, US, vol. 95, No. 12, Dec. 1, 2007 (Dec. 1, 2007), pp. 2354-2367, XP011197859, ISSN: 0018-9219, DOI: 10.1109/JPROC.2007.904441.

Schreckenbach F., et al., "Exit Charts for Iteratively Decoded Multilevel Modulation", 2004 12$^{th}$ European Signal Processing Conference, IEEE, Sep. 6, 2004 (Sep. 6, 2004), pp. 1557-1560, XP032760477, ISBN: 978-3-200-00165-7 [retrieved on Apr. 3, 2015].

\* cited by examiner

METHOD TO ENABLE ITERATIVE PROCESSING AND PERFORM CLOSER TO CONSTRAINED CAPACITY

PRIORITY CLAIM

This application claims priority to and the benefit of provisional patent application No. 62/421,352 filed in the United States Patent Office on Nov. 13, 2016, the entire content of which is incorporated herein by reference as if fully set forth below in its entirety and for all applicable purposes.

TECHNICAL FIELD

The present application relates generally to wireless communication systems, and more particularly, to methods and apparatus for selecting an optimal code book for use when a receiver performs iterative processing of a received signal.

INTRODUCTION

Block codes, or error correcting codes are frequently used to provide reliable transmission of digital messages over noisy channels. In a typical block code, an information message or sequence is split up into blocks, and an encoder at the transmitting device then mathematically adds redundancy to the information message. Exploitation of this redundancy in the encoded information message is the key to reliability of the message, enabling correction for any bit errors that may occur due to the noise. That is, a decoder at the receiving device can take advantage of the redundancy to reliably recover the information message even though bit errors may occur, in part, due to the addition of noise to the channel.

Many examples of such error correcting block codes are known to those of ordinary skill in the art, including Hamming codes, Bose-Chaudhuri-Hocquenghem (BCH) codes, turbo codes, and low-density parity check (LDPC) codes, among others. Many existing wireless communication networks utilize such block codes, such as 3GPP LTE networks, which utilize turbo codes; and IEEE 802.11n Wi-Fi networks, which utilize LDPC codes.

There is continuous demand for ever-increasing wireless network performance, throughput and reliability. Accordingly, there is an ongoing need to develop and deploy improved coding schemes and corresponding encoders and decoders.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, a method for selecting a code book is disclosed. The code book may be selected based on channel conditions and performance of a demodulator or demapper in the receiver. The method includes determining that a receiver in a first wireless communication apparatus is configured for iteratively processing signals received from a channel, selecting a code book for use in communicating over the channel based on conditions affecting transmission of the signals through the channel and performance information associated with a demapper in the receiver, and identifying the selected code book in one or more control channels transmitted to a second wireless communication apparatus.

In another example, an apparatus is disclosed that can select a code book based on channel conditions and performance of a demodulator or demapper in the receiver. The apparatus includes a receiver having a demapper and a decoder that are adapted for iterative processing. The apparatus may be configured to determine that the receiver is configured for iteratively processing signals received from a channel. The apparatus may be configured to select a code book for use in communicating over the channel based on conditions affecting transmission of the signals through the channel and performance information associated with a demapper in the receiver when iterative processing is configured. The apparatus may be configured to identify the selected code book in one or more control channels transmitted to another wireless communication apparatus.

In another example, a non-transitory computer-readable medium storing computer-executable code is disclosed that causes a computer to select a code book based on channel conditions and performance of a demodulator or demapper in the receiver. The code causes the computer to determine whether a receiver in a first wireless communication apparatus is configured for iteratively processing signals received from a channel, select a code book for use in communicating over the channel based on conditions affecting transmission of the signals through the channel and performance information associated with a demapper in the receiver, and identify the selected code book in one or more control channels transmitted to a second wireless communication apparatus.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
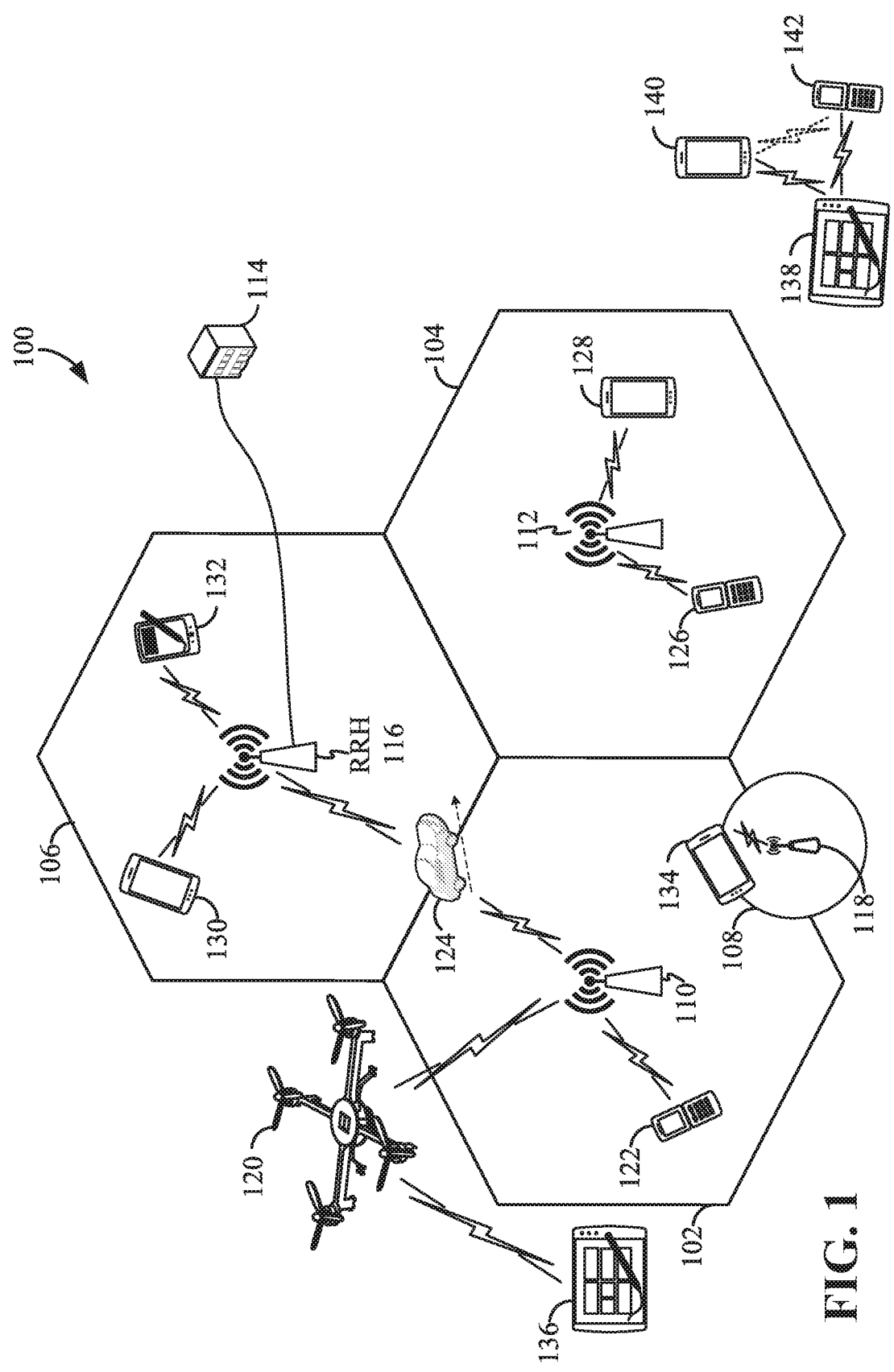
FIG. 1 is a conceptual diagram illustrating an example of an access network.

Certain aspects of this disclosure relate to coding schemes and to wireless communication equipment that can use multiple different code books for exchanging data over channels. The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, each cell is served by a respective base station (BS). Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

In FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some nonlimiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. Transmissions from a base station (e.g., base station 110) to one or more UEs (e.g., UEs 122 and 124) may be referred to as downlink (DL) transmission, while transmissions from a UE (e.g., UE 122) to a base station may be referred to as uplink (UL) transmissions. In accordance with certain aspects of the present disclosure, the term downlink may refer to a point-to-multipoint transmission originating at a scheduling entity 202. Another way to describe this scheme may be to use the term broadcast channel multiplexing. In accordance with further aspects of the present disclosure, the term uplink may refer to a point-to-point transmission originating at a scheduled entity 204.

In some examples, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or traffic information from a base station (e.g., base station 110) to one or more UEs (e.g., UEs 122 and 124) may be referred to as DL transmission, while transmissions of control information and/or traffic information originating at a UE (e.g., UE 122) may be referred to as UL transmissions. In addition, the uplink and/or downlink control information and/or traffic information may be transmitted in frames, where each frame may be further divided into subframes. As one nonlimiting example, a subframe may correspond to a 1 ms duration of time. In accordance with various aspects of the present disclosure, a subframe may include one or more slots, with a slot being defined according to a given number of symbols. The time duration of a slot may differ from one example to another, according to the possibility that the duration of a symbol may differ from one example to another. As used herein, the term slot may refer to a schedulable set of data. As further used herein, the term slot may refer to an encapsulated set of information that is capable of being independently decoded. In addition, a subframe may have any suitable duration (e.g., 250 µs, 500 µs, 1 ms, etc.).

The air interface in the radio access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

In the radio access network 100, the ability for a UE to communicate while moving, independent of its location, is referred to as mobility. The various physical channels between the UE and the radio access network are generally set up, maintained, and released under the control of an access and mobility management function (AMF), which may include a security context management function (SCMF) that manages the security context for both the control plane and the user plane functionality, and a security anchor function (SEAF) that performs authentication. In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
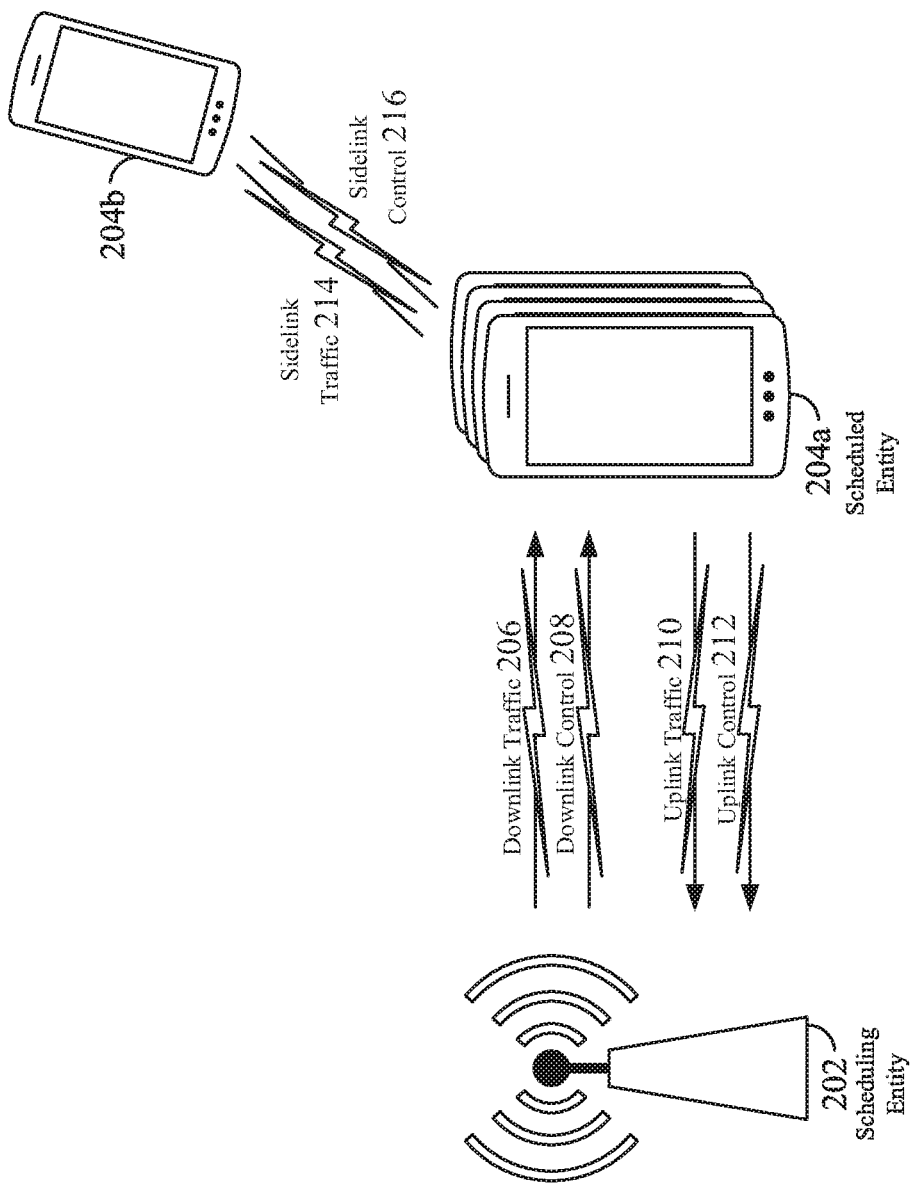
FIG. 2 is a block diagram conceptually illustrating an example of a scheduling entity communicating with one or more subordinate entities according to some embodiments.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204*a* and 204*b*). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast traffic 206 to one or more scheduled entities 204 (the traffic may be referred to as downlink traffic). Broadly, the scheduling entity 202 is a node or device responsible for scheduling traffic in a wireless communication network, including the downlink transmissions and, in some examples, uplink traffic 210 from one or more scheduled entities to the scheduling entity 202. Broadly, the scheduled entity 204 is a node or device that receives control information, including but not limited to scheduling information (e.g., a grant), synchronization or timing information, or other control information from another entity in the wireless communication network such as the scheduling entity 202.

In some examples, scheduled entities such as a first scheduled entity 204*a* and a second scheduled entity 204*b* may utilize sidelink signals for direct D2D communication. Sidelink signals may include sidelink traffic 214 and sidelink control 216. Sidelink control information 216 may in some examples include a request signal, such as a request-to-send (RTS), a source transmit signal (STS), and/or a direction selection signal (DSS). The request signal may provide for a scheduled entity 204 to request a duration of time to keep a sidelink channel available for a sidelink signal. Sidelink control information 216 may further include a response signal, such as a clear-to-send (CTS) and/or a destination receive signal (DRS). The response signal may provide for the scheduled entity 204 to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information 214.

The scheduling entity 202 may broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink traffic 210 and/or downlink traffic 206 including one or more traffic channels, such as a physical downlink shared channel (PDSCH) or a physical uplink shared channel (PUSCH) (and, in some examples, system information blocks (SIBs)), may additionally be transmitted between the scheduling entity 202 and the scheduled entity 204. Transmissions of the control and traffic information may be organized by subdividing a carrier, in time, into suitable transmission time intervals (TTIs).

Furthermore, the scheduled entities 204 may transmit uplink control information 212 including one or more uplink control channels to the scheduling entity 202. Uplink control information may include a variety of packet types and categories, including pilots, reference signals, and information configured to enable or assist in decoding uplink traffic transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the TTI for uplink packet transmissions.

Uplink and downlink transmissions may generally utilize a suitable error correcting block code. In a typical block code, an information message or sequence is split up into blocks, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, convolutional codes and polar codes. Various implementations of scheduling entities 202 and scheduled entities 204 may include suitable hardware and capabilities (e.g., an encoder and/or decoder) to utilize any one or more of these error correcting codes for wireless communication.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

The air interface in the radio access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In some aspects of the disclosure, the scheduling entity and/or scheduled entity may be configured for beamforming and/or multiple-input multiple-output (MIMO) technology. MIMO is a multi-antenna technology that exploits multipath signal propagation so that the information-carrying capacity of a wireless link can be multiplied by using multiple antennas at the transmitter and receiver to send multiple simultaneous streams. At the multi-antenna transmitter, a suitable precoding algorithm (scaling the respective streams' amplitude and phase) is applied (in some examples, based on known channel state information). At the multi-antenna receiver, the different spatial signatures of the respective streams (and, in some examples, known channel state information) can enable the separation of these streams from one another.

Figure 3:
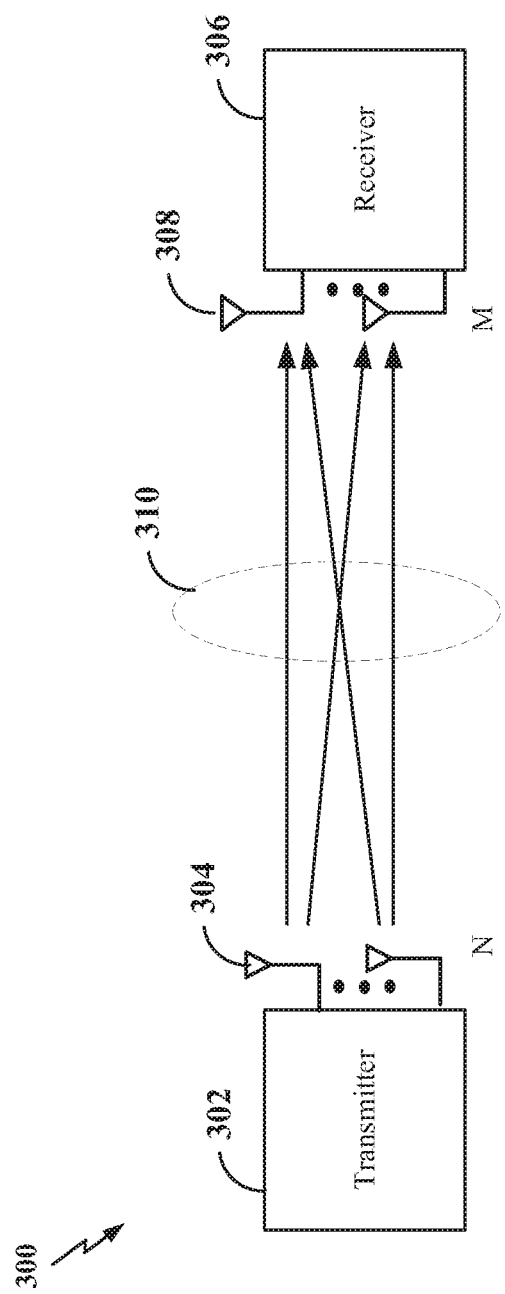
FIG. 3 is a block diagram illustrating a wireless communication system supporting multiple-input multiple-output communication.

FIG. 3 illustrates an example of a wireless communication system supporting MIMO. In a MIMO system 300, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 202, a scheduled entity 204, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

In order for transmissions over the radio access network 100 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 202 and scheduled entities 204 may include suitable hardware and capabilities (e.g., an encoder, a decoder, and/or a CODEC) to utilize one or more of these channel codes for wireless communication In certain examples, 5G NR specifications provide multiple access for uplink (UL) or reverse link transmissions from UEs 122 and 124 to base station 110, and for multi-plexing for downlink (DL) or forward link transmissions from base station 110 to one or more UEs 122 and 124, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 4:
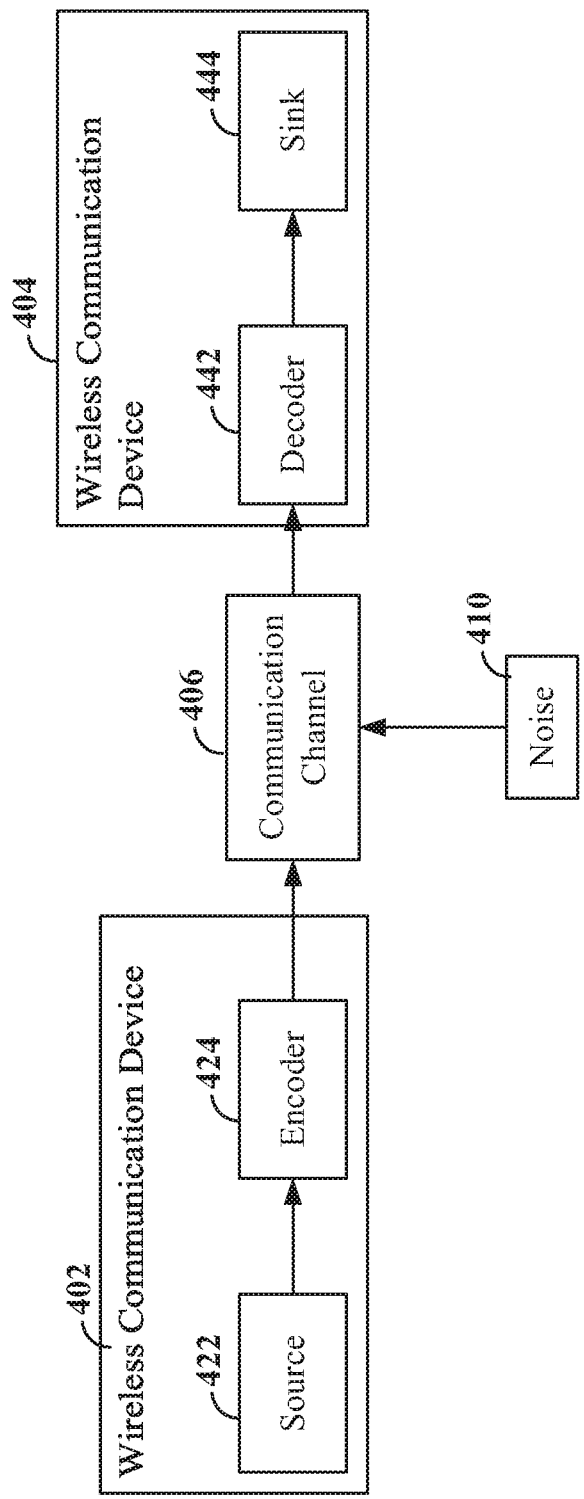
FIG. 4 is a schematic illustration of wireless communication utilizing block codes.

FIG. 4 is a schematic illustration of wireless communication between a first wireless communication device 402 and a second wireless communication device 404. Each wireless communication device 402 and 404 may be a user equipment (UE), a base station, or any other suitable apparatus or means for wireless communication. In the illustrated example, a source 422 within the first wireless communication device 402 transmits a digital message over a communication channel 406 (e.g., a wireless channel) to a sink 444 in the second wireless communication device 404. In order to achieve reliable communication of the digital message, the noise 410 that affects the communication channel 406 must be taken into account.

In an aspect, an encoder 424 at the first (transmitting) wireless communication device 402 may employ forward error correction (FEC) encoding, turbo encoding, low-density parity-check (LDPC) coding, or any other suitable encoding. Block codes, or error correcting codes are frequently used to provide reliable transmission of digital messages over such noisy channels. In a typical block code, an information message or sequence is split up into blocks, each block having a length of K bits. The encoder 424 then mathematically adds redundancy to the information message, resulting in codewords having a length of N, where N>K. Here, the coding rate R is the ratio between the message length and the block length: i.e., R=K/N. Exploitation of this redundancy in the encoded information message is the key to reliability of the message, enabling correction for any bit errors that may occur due to the noise. That is, a decoder 442 at the second (receiving) wireless communication device 404 can take advantage of the redundancy to reliably recover the information message even though bit errors may occur, in part, due to the addition of noise to the channel.

Many examples of such error correcting block codes are known to those of ordinary skill in the art, including Hamming codes, Bose-Chaudhuri-Hocquenghem (BCH) codes, turbo codes, and low-density parity check (LDPC) codes, among others. Many existing wireless communication networks utilize such block codes, such as 3GPP LTE networks, which utilize turbo codes; and IEEE 802.11n Wi-Fi networks, which utilize LDPC codes. Polar codes are linear block error correcting codes that may be used in certain later generations of networks.

Puncturing is often used to obtain length-compatible codes having a codeword whose block length is not a power of 2. For example, to obtain a 1000-bit code word length, 24 bits may be punctured from a $2^{10}=1024$-bit code word.

Figure 5:
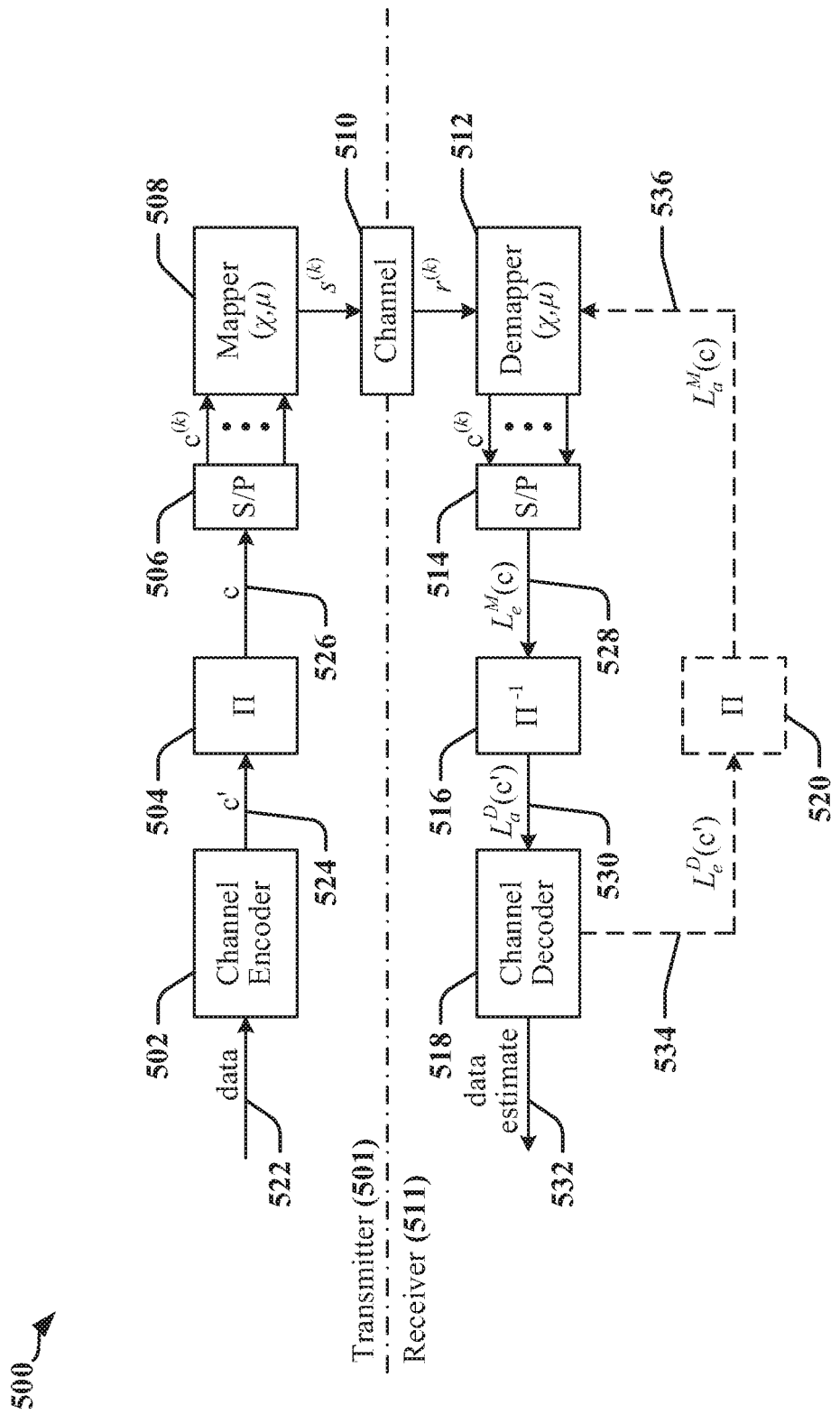
FIG. 5 illustrates an example of a wireless communication system that decodes received signals using iterative processing in accordance with certain aspects disclosed herein.

FIG. 5 illustrates an example of a wireless communication system 500 in which a receiver 511 decodes received signals using iterative processing. Iterative processing may include the exchange of extrinsic information 536 across functional blocks such as a demapper 512 and decoder 518. The transmitter 501 may include a channel encoder 502, an interleaver 504, a serial-to-parallel converter 506 and a mapper 508 that produces an output signal that the receiver 511 may receive through a channel 510. The receiver 511 may include a demapper 512, a parallel-to-serial converter 514, a deinterleaver 516 and a channel decoder 518. The receiver 511 may also provide a feedback path through an interleaver 520, which operates in the same manner as the interleaver 504 of the transmitter 501 and may perform the reverse operation of the deinterleaver 516 in the receiver 511. The feedback path provides a priori information that the receiver 511 may use to improve the data estimate 532 produced by the demapper 512 and/or channel decoder 518. In the illustrated system 500, $L^M_e(c)$ represents extrinsic information 528 generated by the demapper 512. The deinterleaver 516 receives the latter extrinsic information 528 and provides deinterleaved extrinsic information 530 as a priori input to the decoder 518. The deinterleaved extrinsic information 530 may be represented as $L^D_a(c')$. On the feedback path, $L^D_e(c')$ represents extrinsic information 534 generated by the channel decoder 518. The interleaver 520 receives the extrinsic information 534 and provides interleaved extrinsic information 536 as a priori input to the demapper 512. The interleaved extrinsic information 536 may be represented as $L^M_a(c)$.

Figure 6:
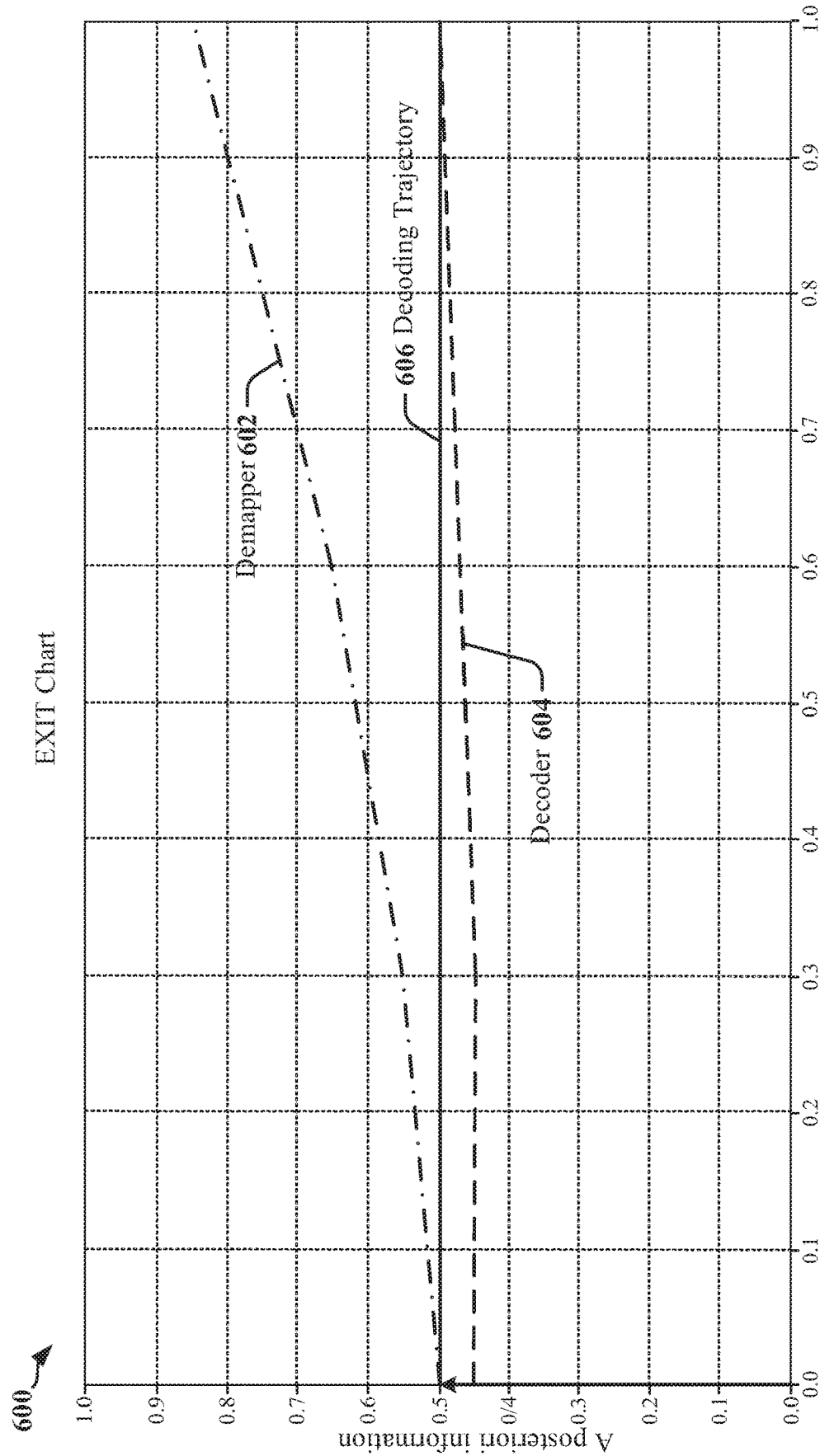
FIG. 6 illustrates a first extrinsic information transfer chart that may be used to characterize certain aspects of progress of iterative processing in accordance with certain aspects disclosed herein.

Certain aspects disclosed herein may enable the selection of a code book that optimizes the performance of iterative decoding. FIG. 6 is a first extrinsic information transfer (EXIT) chart 600 that may be used to characterize certain aspects of progress of iterative processing. The first EXIT chart 600 illustrates certain aspects of the iterative decoding trajectory and the exchange of information between decoder 518 and demapper 512 in a conventional system (a posteriori information v. a priori information). The EXIT chart 600 is an example plotting a posteriori on the y-axis and a priori on the x-axis, which may characterize performance of the demapper 512. An EXIT chart for the decoder 518 may plot a priori on the y-axis against a posteriori on the x-axis. A first curve 602 relates to the performance of the demapper 512, a second curve 604 relates to the performance of the decoder 518 and the third curve 606 illustrates decoding trajectory with increased information exchange. In conventional systems, the area under the second curve 604 may be considered to represent the information rate that can be supported by the corresponding iterative receiver.

Improved performance may be attained by targeting constrained capacity associated with iterative processing, as opposed to targeting a Bit-Interleaved Coded Modulation (BICM) capacity that can be approached when performing only one-pass demodulation followed by decoding. Certain aspects disclosed herein provide apparatus and methods applicable to QAM, MIMO configurations where more than one modulation and coding scheme (MCS) is available for use on a channel. In some examples, a UE may communicate the selected MCS in uplink control channel feedback provided to a base station. In another example, a base station or other scheduling entity may identify the MCS to a UE in downlink control channel MCS selection information may be transmitted in each slot. In some examples, multiple MCS selection information may be provided in feedback for a group-of-layers. MCS fed back on a per-group-of-layers basis may be provided in LTE for example. In such cases, there may be multiple transport blocks with different MCS mapped to the same tone across different layers.

Figure 7:
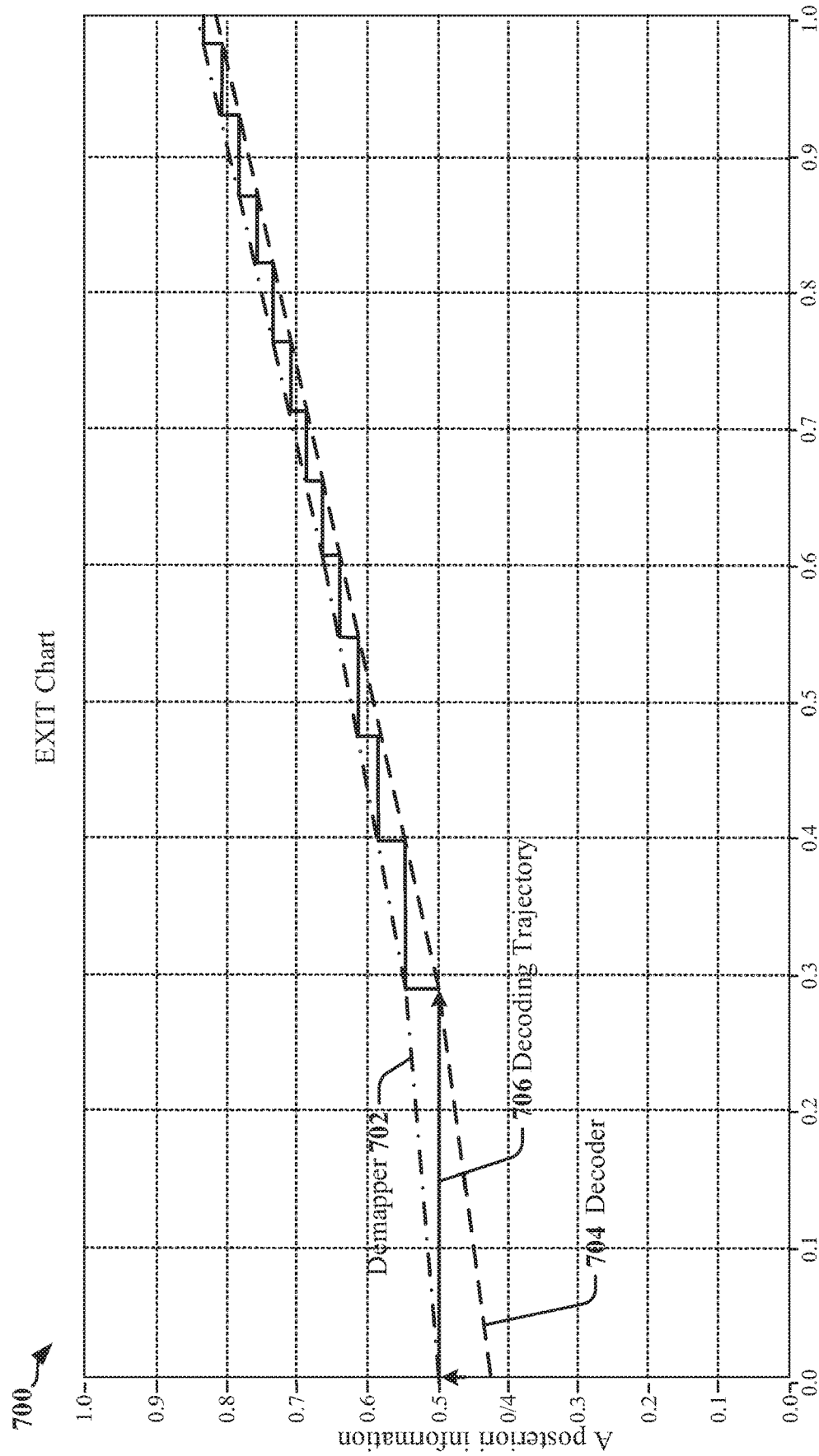
FIG. 7 provides a second extrinsic information transfer chart that illustrates expected performance of a receiver adapted according to certain aspects disclosed herein

FIG. 7 provides a second EXIT chart 700 that illustrates expected performance of a receiver adapted according to certain aspects disclosed herein. In some aspects, disclosed herein, a receiver 511 configured for iterative processing, which performs iterations between the demapper 512 and the decoder 518 employs codes that may be designed such that the EXIT charts of the demapper 512 and the decoder 518 closely match. The second EXIT chart illustrates the iterative decoding trajectory and the exchange of information between the decoder 518 and demapper 512 when a mechanism is provided to enable the UE and/or base station to configure encoding and/or decoding based on EXIT charts developed for different channel conditions. In some examples, the UE and/or base station may select an MCS based on whether the receiver 511 is capable of iterative processing. The resulting curves 702, 704 and 706 represent improved system performance with increased demapper performance. In some examples, the UE and/or base station may communicate the selected MCS to its communication partner (the base station and/or UE, respectively) using channel quality indication (CQI) feedback.

Regarding the chart 600, it may be assumed that:

$z = x + n$, where $x \in \pm 1, n \sim \aleph(0, \sigma_1^2)$.

A conditional probability density function (PDF) of z may be expressed as:

$$p(z \mid X = x) = \frac{e^{((z-x)^2/2\sigma_n^2)}}{\sqrt{2\pi}\, \sigma_n}$$

Then LLR of z may be calculated as:

$$Z = \ln \frac{p(z \mid x = +1)}{p(z \mid x = -1)} \to Z = \frac{2}{\sigma_n^2} \cdot z = \frac{2}{\sigma_n^2} \cdot (x + n) \to z = \mu_Z \cdot x + n_Z$$

where: $\mu_Z = 2/\sigma_n^2 \quad \sigma_Z^2 = 4/\sigma_n^2$.

Where a priori LLR is denoted by A, then:

$A = \mu_A \cdot x + n_A$, where $n_A \sim \aleph(0, \sigma_1^2), \mu_A = \sigma_A^2/2$ To obtain an EXIT chart 600:

$$p_A(\xi \mid X = x) = \frac{e^{-((\xi - (\sigma_A^2/2)\cdot x)^2/2\sigma_A^2)}}{\sqrt{2\pi}\, \sigma_A}$$

Mutual Information is defined as, $I_A$:

$$I_A = \frac{1}{2} \cdot \sum_{x=-1,1} \int_{-\infty}^{+\infty} p_A(\xi \mid X = x) \times \log_2 \frac{2 \cdot p_A(\xi \mid X = x)}{p_A(\xi \mid X = -1) + p_A(\xi \mid X = 1)} d\xi$$

Substituting equation for PDF of A:

$$I_A(\sigma_A) = 1 - \int_{-\infty}^{+\infty} \frac{e^{-((\xi-\sigma_A^2/2)^2/2\sigma_A^2)}}{\sqrt{2\pi}\,\sigma_A} \cdot \log_2[1 + e^{-\xi}]d\xi$$

It may be noted that: $0 \leq I_A \leq 1$

An EXIT chart 600 may be obtained by feeding $L_A$ into the functional block, obtaining $L_E$ as extrinsic information, and calculating $I_E$ as follows:

$$I_E = \frac{1}{2} \cdot \sum_{x=-1,1} \int_{-\infty}^{+\infty} p_E(\xi | X = x) \times ld \log_2 \frac{2 \cdot p_E(\xi | X = x)}{p_E(\xi | X = -1) + p_E(\xi | X = 1)} d\xi$$

The EXIT chart may then be plotted as $I_A$ vs $I_E$.

The example of FIG. 6 may relate to a receiver that employs a 2×2 linear minimum mean square error (LMMSE), which may be characterized by a non-flat EXIT chart 600. The EXIT chart 600 may correspond to a receiver configured for maximum likelihood (ML) detection for a MIMO channel. The area under the EXIT chart may be considered to represent the information rate that can be supported by the corresponding iterative receiver. The code-rate of an outer error-correcting code book may be maximized when the EXIT chart for the code book is "matched" to the EXIT chart of the inner receiver (e.g., the demapper 512). Code books can be selected for a channel and current channel conditions based on an optimal match. In one example, an optimal code book may be designed such that its EXIT chart will be equal to the EXIT chart of the demapper.

According to certain aspects disclosed herein, a code book may be selected by obtaining the ML, LMMSE and/or other EXIT charts of the demapper 512 at different configurations of signal to noise ratio (SNR) and channel model corresponding to the discrete mother-code-rates of the outer code (e.g. LDPC, polar code etc.). Selection of a code book may also be based on MIMO configuration. For example, the number of antennas assigned or deployed for transmitters and receivers (NTx×NRx) may affect the selection of a code book. Different numbers or combinations of antennas will change the shape and/or slope of the EXIT chart for the demapper 512. Selection of a code book may also be based on the constellation used (e.g., 64-QAM, 256-QAM etc.). The EXIT charts may vary under different channel conditions. For example, changes in the upper curve 602 may vary with SNR and/or the effects of SNR on different constellations. A constellation may define or represent mapping bit values in real and imaginary space (e.g., in-phase I and quadrature Q). The code book may be designed or selected to ensure that the EXIT chart of the code book closely matches the EXIT chart of the demapper 512. In one example involving LDPC, EXIT charts may be matched based on an evaluation of check nodes and variable nodes for specific sets of variables. In certain graphical representations of LDPC codes, check nodes represent the number of parity bits, while variable nodes represent the number of bits in a code word.

In some applications, the UE and/or base station may maintain a plurality of code books that have been designed by modeling and EXIT chart analysis. Such codes may be referred to as "iterative-codes." In some instances, a sub-code may be derived from an original non-iterative channel code. The sub-code may be designed based on analysis using EXIT charts. The sub-code may accrue the same benefits as the iterative-code and the iterative-code may be considered as different redundancy version (RV) of the base code.

In accordance with certain aspects disclosed herein, codes can be adapted from existing LDPC designs by carefully picking variable-node and check-node degrees to match the optimal profile, which may correspond to an EXIT graph for the demapper 512 under certain channel conditions. This adaptation process may be performed differently for different code-rates. An adaptation of variable nodes may be achieved using a different puncturing mechanism on the transmitter. For example, out coded-bits may be punctured when the out coded-bits do not align with the code-profile required by design requirements or specifications.

According to certain aspects disclosed herein, a UE that is configured to perform iterative processing between demapping and decoding may signal to a base station or scheduling entity that a specific "iterative-code" should be picked for encoding a transmission on a control channel. In one example, the UE may signal a code choice using a channel state feedback (CSF). The base station may schedule PDSCH, for example, using the iterative-code requested by the UE. In another example, the base station may signal the UE to use a specified iterative coding scheme for the uplink. The UE may then transmit PUSCH using a corresponding one of the iterative codes maintained by the UE. In some examples, signaling may be exchanged to select a coding scheme to be used on control channels (such as PDCCH) when convolutional coding is to be used.

According to certain aspects disclosed herein, a coding scheme for communication between the UE and base station may be configured through signaling. When a receiver in the UE or base station is configured to use iterative processing in its receiver, an optimal coding scheme for the channel conditions and the demapper 512 may be used for communication. In some instances, the coding scheme may be selected based on UE capability and through an exchange of signaling the enables transmission of iterative-codes initiated by the UE or the base station.

In some implementations, different iterative codes may be employed for different QAM and MIMO configurations. In the MIMO example, the selection of an iterative code may be configured based on the number of transmitters and/or number of receivers (NTx×NRx). In some examples, selection of a coding scheme may be performed while the UE and/or base station are evaluating channel quality. The UE and/or base station may integrate iterative code selection into a CQI determination algorithm and code selections may be automatically provided in feedback exchanged between the UE and the base station.

Figure 8:
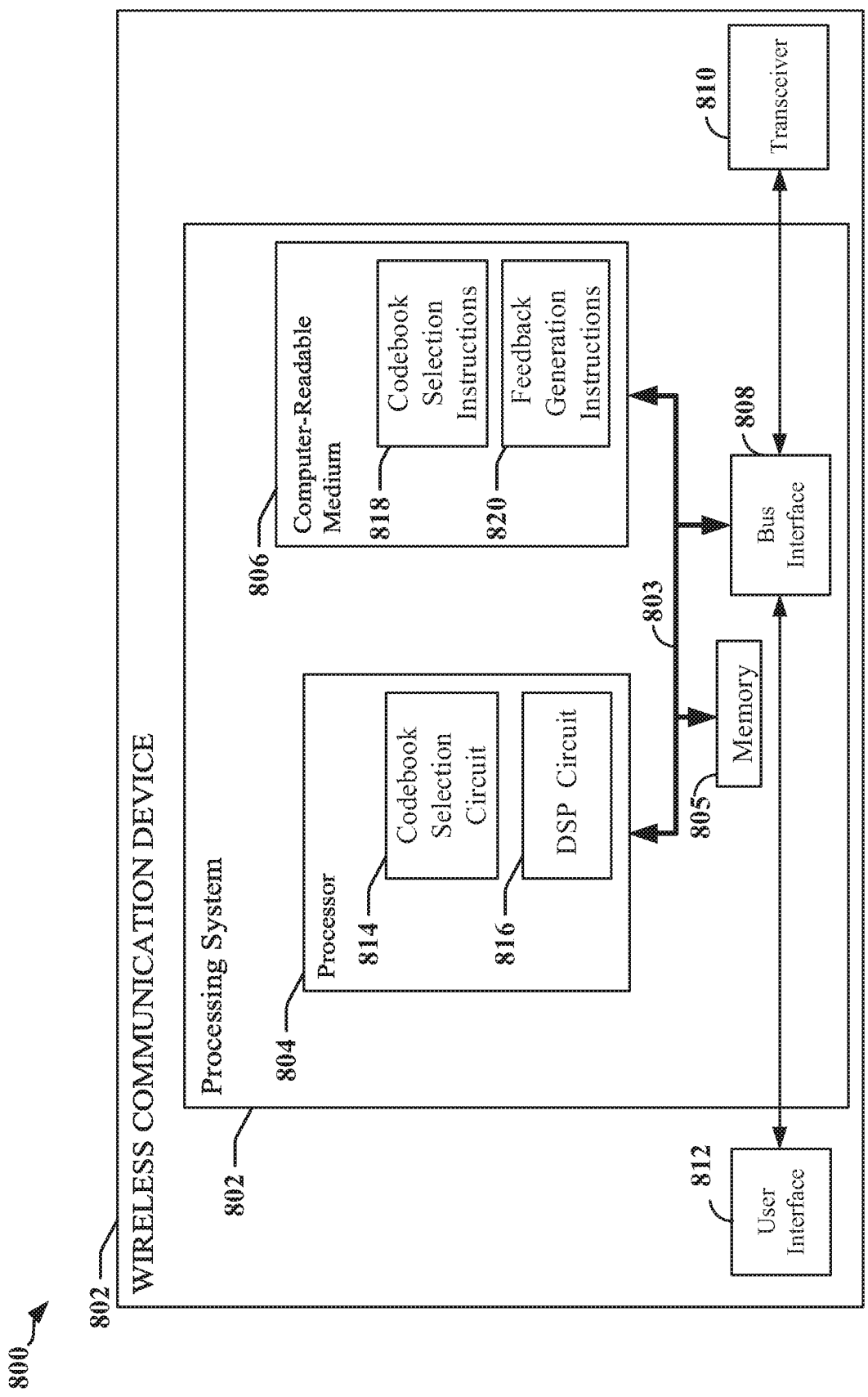
FIG. 8 is a block diagram illustrating an example of a hardware implementation for an apparatus employing a processing system.

FIG. 8 is a block diagram illustrating an example of a hardware implementation for a wireless communication device 800 employing a processing system 802. In an aspect, the wireless communication device 800 may be a user equipment (UE), such as illustrated in FIG. 1 or any entity capable of transmitting data in at least one of a UL or DL direction. It is noted, however, that the wireless communication device 800 may also be configured as a scheduling entity, as the presently disclosed concepts may be implemented in a base station or a UE, as examples.

The wireless communication device 800 may be implemented with a processing system 802 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 800 may be configured to perform any one or more of the functions described herein. That is, the processor 804, as utilized in a wireless communication device 800, may be used to implement any one or more of the processes described herein for selecting a code book to control modulation and spreading.

In this example, the processing system 802 may be implemented with a bus architecture, represented generally by the bus 803. The bus 803 may include any number of interconnecting buses and bridges depending on the specific application of the processing system 802 and the overall design constraints. The bus 803 communicatively couples various circuits including one or more processors (represented generally by the processor 804), a memory 805, and computer-readable media (represented generally by the computer-readable medium 806). The bus 803 may also link various other circuits such as timing sources, peripherals, voltage regulators, and power management circuits, which are well known in the art, and therefore, will not be described any further. A bus interface 808 provides an interface between the bus 803 and a transceiver 810. The transceiver 810 provides a means for communicating with various other apparatus over a transmission medium, and may include at least in part means for transmitting and receiving signals modulated according to a selected code book. Depending upon the nature of the apparatus, a user interface 812 (e.g., keypad, display, speaker, microphone, joystick) may also be provided.

In some aspects of the disclosure, the processor 804 may include circuitry 814 configured for various functions, including, for example, selecting a code book according to the presently disclosed concepts. Additionally, circuitry 808 may communicatively couple with or interface with the transceiver 810 for directing either transmission or reception of signals using the code books selected as disclosed herein. In other aspects of the disclosure, the processor may include DSP circuitry 816 that provides data to be transmitted (or processes data received) with the transceiver 810, such as the input binary bit stream illustrated in FIG. 4, as one example.

The processor 804 is responsible for managing the bus 803 and general processing, including the execution of software stored on the computer-readable medium 806. The software, when executed by the processor 804, causes the processing system 802 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 806 may reside in the processing system 802, external to the processing system 802, or distributed across multiple entries including the processing system 802. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable medium 806 may include code book generating or establishing instructions or software 818 configured for various functions, including, for example, determining channel conditions and operational aspects of a demapper under such channel conditions according to certain of the concepts disclosed herein. In some examples, the code book selecting software 820 may be configured to select a code book based on channel conditions and/or an indication from a scheduling entity.

In a further aspect, the computer-readable medium 806 may include modulation selection instructions or software 818 configured for various functions, including, for example, selection of modulation (and encoding) schemes, such as definition of code books, and further the selection of which code book from a plurality of code books, as well as encoding, should be utilized for transmissions by transceiver 810, either for transmission or reception of signals. It is also noted that the wireless communication device 800 while described as a subordinate entity, could also be implemented as a scheduling entity as well.

Figure 9:
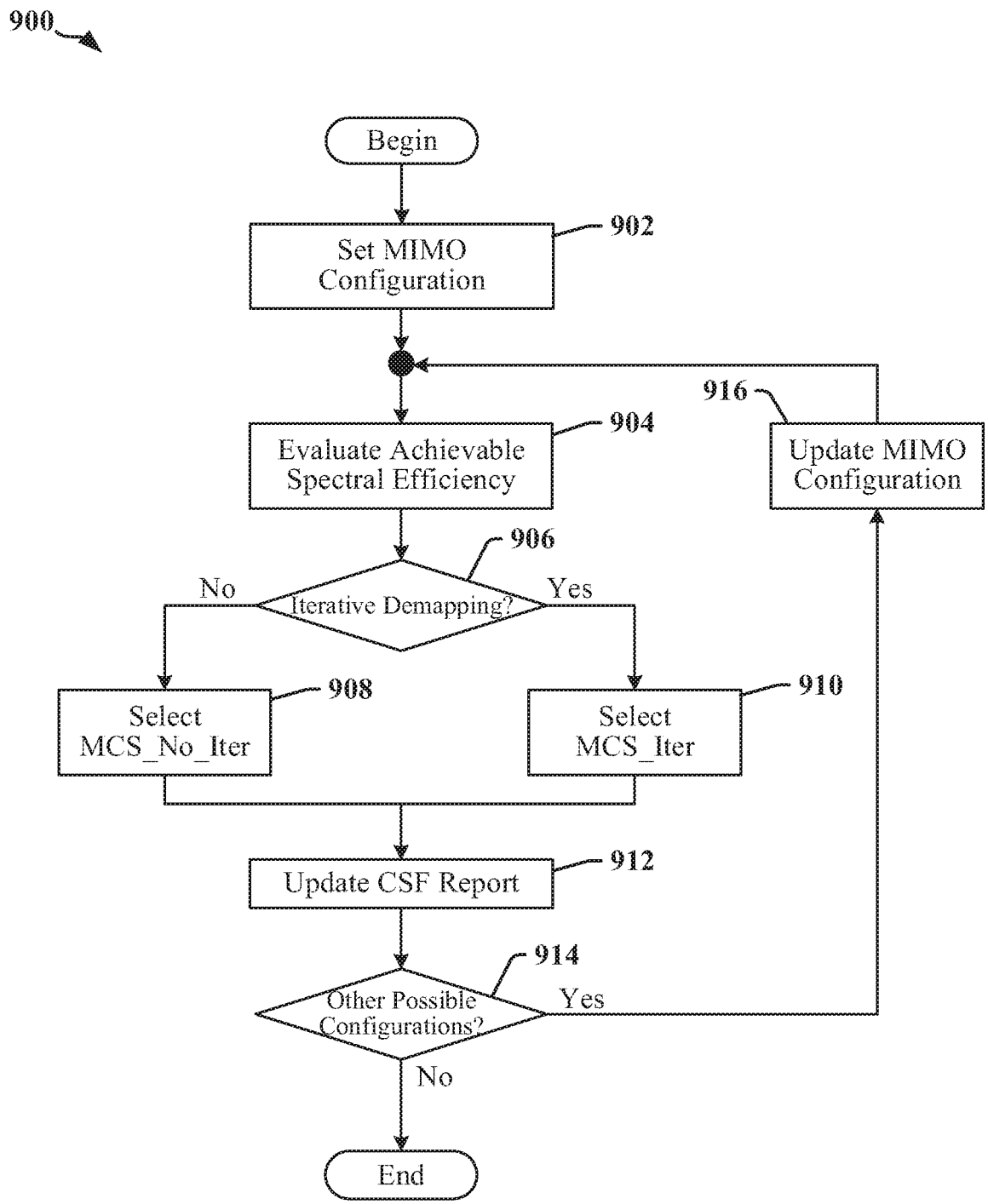
FIG. 9 is a first flow diagram of an exemplary method for selecting a code book.

FIG. 9 is a flow chart illustrating one example of a methodology or process 900 for selecting a code book when iterative processing is used in accordance with certain aspects of the present disclosure. As described below, some or all illustrated features may be omitted in a particular implementation within the scope of the present disclosure, and some illustrated features may not be required for implementation of all embodiments. In some examples, the process 900 may be carried out by the wireless communication device 800 illustrated in FIG. 8. The process 900 may be carried out by any suitable apparatus or means for carrying out the functions or algorithm described below.

The concepts and techniques illustrated by the process or methodology 900 illustrated in FIG. 9 may relate immediately to a system that can be configured for MIMO, but many, if not all, of these concepts and techniques are applicable to other radio configurations and other access technologies. MIMO provides capabilities for sending and receiving multiple signals simultaneously over the same radio channel through the exploitation of multipath propagation. In one example, MIMO can be configured in a precoding mode whereby a signal can be transmitted through each of a plurality of antennas with phase and gain weightings calculated to maximize signal power detected at the receiver. In another example, MIMO can be configured in a spatial multiplexing mode in which the signal is split among a plurality of same-frequency signals transmitted by a corresponding plurality of antennas same frequency channel in a manner that may combat high SNR. In another example, MIMO can be configured to use diversity coding techniques that employ space-time coding to provide a plurality of orthogonally coded signals to enhance signal diversity.

At block 902, process 900 includes a process for setting a MIMO configuration. At block 904, process 900 includes a process for evaluating spectral efficiency of the MIMO configuration set at block 902. At block 906, process 900 includes a process for determining whether iterative demapping is to be used. If at block 906 it is determined that iterative demapping is not to be performed, then the MCS is selected accordingly at block 908. If at block 906 it is determined that iterative demapping is not to be performed, then the MCS is selected accordingly at block 908. At block 912, process 900 includes a process for updating a CSF report that reports the MCS selected at block 908 or 910. In some instances, the process 900 includes a process at block 914 for determining whether other MIMO configurations are possible, and/or preferable. If no other possible or preferable MIMO configurations are available, then the process 900 may be terminated. If another possible or preferable MIMO configuration is available, the process 900 may continue at block 916, where the MIMO configuration is updated and, thereafter, the process 900 returns to block 904.

Figure 10:
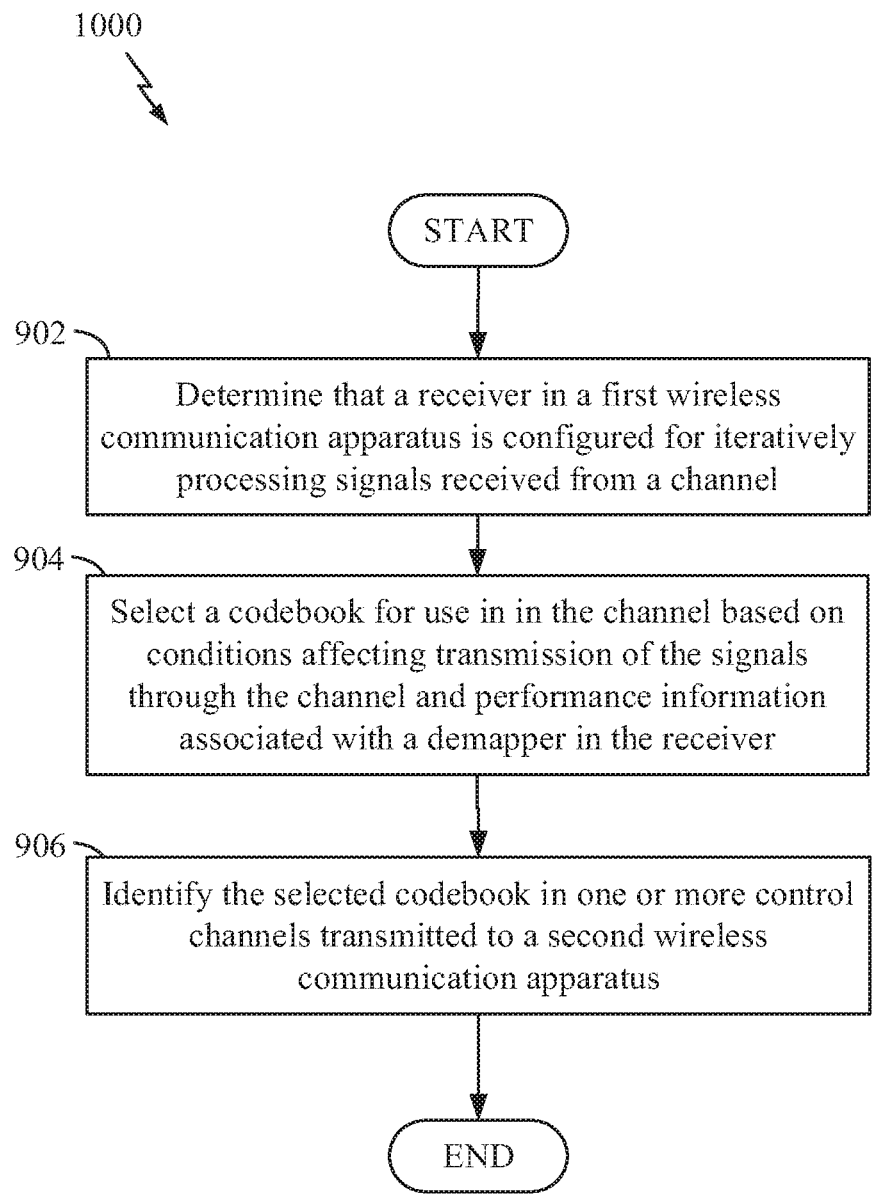
FIG. 10 is a second flow diagram of an exemplary method for selecting a code book.

FIG. 10 is a flow chart illustrating one example of a methodology or process 1000 for selecting a code book when iterative processing is used in accordance with certain aspects of the present disclosure. As described below, some or all illustrated features may be omitted in a particular implementation within the scope of the present disclosure, and some illustrated features may not be required for implementation of all embodiments. In some examples, the process 1000 may be carried out by the wireless communication device 800 illustrated in FIG. 8. The process 1000 may be carried out by any suitable apparatus or means for carrying out the functions or algorithm described below.

At block 1002, process 1000 includes a process for determining that a receiver in a first wireless communication apparatus is configured for iteratively processing signals received from a channel. The first wireless communication apparatus may be configured for iteratively processing signals when a decoder in the receiver provides a feedback signal to the demapper.

At block 1004, process 1000 includes a process for selecting a code book for use in communicating over the channel based on conditions affecting transmission of the signals through the channel and performance information associated with a demapper in the receiver. The conditions affecting transmission of the signals through the channel may include a signal-to-noise ratio. The performance information associated with the demapper may relate to the selected code book under a variety of channel conditions.

At block 1006, process 1000 includes a process for identifying the selected code book in one or more control channels transmitted to a second wireless communication apparatus.

In some examples, the first wireless communication apparatus comprises a base station, and the second apparatus comprises a user equipment. The base station may receive channel quality indication feedback from the first apparatus, and transmit, to the first device, an indicator identifying the selected code book in a plurality of code books maintained by the first wireless communication apparatus for use when signals are iteratively processed. The selected codebook may be selected based on the channel quality indication feedback. In some instances, the base station may determine an uplink channel quality at the first wireless communication apparatus, and transmit an indicator to the second wireless communication apparatus, where the indicator identifies the selected code book in a plurality of code books maintained by the second wireless communication apparatus for use when signals are iteratively processed. The selected codebook may be selected based on the uplink channel quality.

In some examples, the first wireless communication apparatus comprises a user equipment, and the second apparatus comprises a base station. The UE may measure signal-to-noise ratio in the channel, transmit the signal-to-noise ratio in channel quality indication feedback to the second apparatus, and receive, from the second apparatus, an indicator identifying one of a plurality of code books maintained by the first device configured for use when signals are iteratively processed.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-9 may be rearranged and/or combined into a single component, step, feature or function or embodied in several components, steps, or functions.

Additional elements, components, steps, and/or functions may also be added without departing from novel features disclosed herein. The apparatus, devices, and/or components illustrated in FIGS. 1-9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising:
   determining that a receiver in a first wireless communication apparatus is configured for iteratively processing signals received from a channel;
   at the first wireless communication apparatus:
      comparing nodes in extrinsic information transfer (EXIT) characteristics of a plurality of code books with corresponding nodes in an EXIT characteristic of a demapper of the first wireless communication apparatus under channel conditions affecting the signals received from the channel in a first slot;
      selecting a coding scheme for use in a second slot to be transmitted over the channel based on the comparison of the nodes in EXIT characteristics, wherein the coding scheme is selected to improve demapper performance for channel conditions at the receiver and includes a code book selected from the plurality of code books; and
      identifying the selected code book in one or more control channels transmitted from the first wireless communication apparatus to a second wireless communication apparatus; and
      iteratively decoding one or more transmissions from the second wireless communication apparatus encoded in the second slot using the selected coding scheme.

2. The method of claim 1, wherein the nodes include variable nodes and check nodes under different channel conditions, wherein the check nodes represent a number of parity bits and the variable nodes represent a number of bits in a code word, and wherein nodes associated with the selected code book match nodes associated with the demapper.

3. The method of claim 1, wherein at least one code book in the plurality of code books is configured by puncturing one or more unaligned coded-bits for a corresponding coderate.

4. The method of claim 1, wherein the first wireless communication apparatus comprises a base station, and the second wireless communication apparatus comprises a user equipment, wherein the first slot precedes the second slot in transmission, and wherein the coding scheme selected by the base station for use in the second slot is different from a coding scheme used for uplink transmission to the base station in the first slot.

5. The method of claim 4, and further comprising:
   receiving channel quality indication feedback from the first wireless communication apparatus; and
   transmitting to the first wireless communication apparatus an indicator identifying the selected code book in a plurality of code books maintained by the first wireless communication apparatus for use when signals are iteratively processed, wherein the selected code book is selected based on the channel quality indication feedback.

6. The method of claim 4, and further comprising:
   determining an uplink channel quality at the first wireless communication apparatus; and
   transmitting to the second wireless communication apparatus an indicator identifying the selected code book in a plurality of code books maintained by the second wireless communication apparatus for use when signals are iteratively processed, wherein the selected code book is selected based on the uplink channel quality.

7. The method of claim 1, wherein the first wireless communication apparatus comprises a user equipment, and the second wireless communication apparatus comprises a base station, wherein the first slot precedes the second slot in transmission, and wherein the coding scheme selected by the user equipment for use in the second slot is different from a coding scheme used for downlink transmission to the user equipment in the first slot.

8. The method of claim 7, and further comprising:
   measuring signal-to-noise ratio in the channel;
   transmitting the signal-to-noise ratio in channel quality indication feedback to the second wireless communication apparatus; and
   receiving from the second wireless communication apparatus an indicator identifying the selected code book in a plurality of code books maintained by the first wireless communication apparatus for use when signals are iteratively processed, wherein the selected code book is selected based on the signal-to-noise ratio.

9. The method of claim 1, wherein the first wireless communication apparatus is configured for iteratively processing signals when a decoder in the receiver provides a feedback signal to the demapper.

10. A wireless communication apparatus comprising:
    a wireless transceiver configured to communicate over a channel to one or more devices;

a receiver adapted to iteratively process signals received from the channel using a demapper; and
a processing circuit configured to:
determine that the receiver is configured for iteratively processing the signals received from the channel;
comparing nodes in extrinsic information transfer (EXIT) characteristics of a plurality of code books with corresponding nodes in an EXIT characteristic of the demapper under channel conditions affecting the signals received from the channel in a first slot;
select a coding scheme for use in a second slot to be transmitted over the channel based on the comparison of the nodes in EXIT characteristics, wherein the coding scheme is selected to improve demapper performance for channel conditions at the receiver and includes a code book selected from the plurality of code books;
identify the selected code book in one or more control channels transmitted to a second wireless communication apparatus; and
iteratively decode one or more transmissions from the second wireless communication apparatus encoded in the second slot using the selected coding scheme.

11. The wireless communication apparatus of claim 10, wherein the nodes include variable nodes and check nodes under different channel conditions, wherein the check nodes represent a number of parity bits and the variable nodes represent a number of bits in a code word, and wherein nodes associated with the selected code book match nodes associated with the demapper.

12. The wireless communication apparatus of claim 10, wherein at least one code book in the plurality of code books is configured by puncturing one or more unaligned coded-bits for a corresponding code-rate.

13. The wireless communication apparatus of claim 12, wherein the processing circuit is configured to:
receive channel quality indication feedback from the wireless communication apparatus; and
provide the wireless communication apparatus with an indicator identifying the selected code book in a plurality of code books maintained by the wireless communication apparatus for use when signals are iteratively processed, wherein the selected code book is selected based on the channel quality indication feedback.

14. The wireless communication apparatus of claim 12, wherein the processing circuit is configured to:
determine uplink channel quality at the wireless communication apparatus; and
provide an indicator to the wireless communication apparatus identifying the selected code book in a plurality of code books maintained by the wireless communication apparatus for use when signals are iteratively processed, wherein the selected code book is selected based on the uplink channel quality.

15. The wireless communication apparatus of claim 10, wherein the wireless communication apparatus comprises a user equipment, and the second wireless communication apparatus comprises a base station, wherein the first slot precedes the second slot in transmission, and wherein the coding scheme selected by the user equipment for use in the second slot is different from a coding scheme used for downlink transmission to the user equipment in the first slot.

16. The wireless communication apparatus of claim 15, wherein the processing circuit is configured to:
measure signal-to-noise ratio in the channel;
transmit the signal-to-noise ratio in channel quality indication feedback to the second wireless communication apparatus; and
receive an indicator from the second wireless communication apparatus identifying the selected code book in a plurality of code books maintained by the wireless communication apparatus for use when signals are iteratively processed, wherein the selected code book is selected based on the signal-to-noise ratio.

17. The wireless communication apparatus of claim 10, wherein the wireless communication apparatus is configured for iteratively processing signals when a decoder in the receiver provides a feedback signal to the demapper.

18. An apparatus, comprising:
means for determining that a receiver in a first wireless communication apparatus is configured for iteratively processing signals received from a channel, including signals received in a first slot;
means for selecting a coding scheme for use in communicating over the channel based on conditions affecting transmission of the signals through the channel and performance information associated with a demapper in the receiver, wherein the coding scheme is selected for use in a second slot to be transmitted over the channel and includes a code book that is selected based on a comparison of nodes in extrinsic information transfer (EXIT) characteristics of a plurality of code books with corresponding nodes in an EXIT characteristic of the demapper under channel conditions affecting the signals during transmission of the first slot, and wherein the coding scheme is selected to improve demapper performance for channel conditions at the receiver and includes a code book selected from the plurality of code books;
means for identifying the selected code book in one or more control channels transmitted from the first wireless communication apparatus to a second wireless communication apparatus; and
means for iteratively decoding one or more transmissions from the second wireless communication apparatus encoded in the second slot using the selected coding scheme.

19. The apparatus of claim 18, wherein the nodes include variable nodes and check nodes under different channel conditions, wherein the check nodes represent a number of parity bits and the variable nodes represent a number of bits in a code word, and wherein nodes associated with the selected code book match nodes associated with the demapper.

20. The apparatus of claim 18, wherein the first wireless communication apparatus comprises a base station, and the second wireless communication apparatus comprises a user equipment, wherein the first slot precedes the second slot in transmission and wherein the coding scheme selected by the base station for use in the second slot is different from a coding scheme used for uplink transmission to the base station in the first slot, and further comprising:
means for receiving channel quality indication feedback from the first wireless communication apparatus; and
means for transmitting to the first wireless communication apparatus an indicator identifying the selected code book in a plurality of code books maintained by the first wireless communication apparatus for use when signals are iteratively processed, wherein the selected code book is selected based on the channel quality indication feedback.

21. The apparatus of claim 18, wherein the first wireless communication apparatus comprises a user equipment, and the second wireless communication apparatus comprises a base station, wherein the first slot precedes the second slot in transmission, and wherein the coding scheme selected by the base station for use in the second slot is different from a coding scheme used for uplink transmission to the base station in the first slot, and further comprising:
  means for measuring signal-to-noise ratio in the channel;
  means for transmitting the signal-to-noise ratio in channel quality indication feedback to the second wireless communication apparatus; and
  means for receiving from the second wireless communication apparatus an indicator identifying the selected code book in a plurality of code books maintained by the first wireless communication apparatus for use when signals are iteratively processed, wherein the selected code book is selected based on the signal-to-noise ratio.

22. The apparatus of claim 18, wherein the first wireless communication apparatus is configured for iteratively processing signals when a decoder in the receiver provides a feedback signal to the demapper.

23. A non-transitory computer-readable medium storing computer-executable code, comprising code for causing a computer to:
  determine that a receiver in a first wireless communication apparatus is configured for iteratively processing signals received from a channel;
  compare nodes in extrinsic information transfer (EXIT) characteristics of a plurality of code books with corresponding nodes in an EXIT characteristic of a_demapper in the receiver under channel conditions affecting the signals received from the channel in a first slot;
  select a coding scheme for use in a second slot to be transmitted over the channel based on the comparison of the nodes in EXIT characteristics, wherein the coding scheme is selected to improve demapper performance for channel conditions at the receiver and includes a code book selected from the plurality of code books;
  identify the selected code book in one or more control channels transmitted from the first wireless communication apparatus to a second wireless communication apparatus; and
  iteratively decode one or more transmissions from the second wireless communication apparatus encoded in the second slot using the selected coding scheme.

24. The computer-readable medium of claim 23, wherein the nodes include variable nodes and check nodes under different channel conditions, wherein the check nodes represent a number of parity bits and the variable nodes represent a number of bits in a code word, and wherein nodes associated with the selected code book match nodes associated with the demapper.

25. The computer-readable medium of claim 23, wherein at least one code book in the plurality of code books is configured by puncturing one or more unaligned coded-bits for a corresponding code-rate.

26. The computer-readable medium of claim 23, wherein the first wireless communication apparatus comprises a base station, and the second wireless communication apparatus comprises a user equipment, wherein the first slot precedes the second slot in transmission, and wherein the coding scheme selected by the base station for use in the second slot is different from a coding scheme used for uplink transmission to the base station in the first slot.

27. The computer-readable medium of claim 26, and further comprising code for causing a computer to:
  receive channel quality indication feedback from the first wireless communication apparatus; and
  transmit to the first wireless communication apparatus an indicator identifying the selected code book in a plurality of code books maintained by the first wireless communication apparatus for use when signals are iteratively processed, wherein the selected code book is selected based on the channel quality indication feedback.

28. The computer-readable medium of claim 23, wherein the first wireless communication apparatus comprises a user equipment, and the second wireless communication apparatus comprises a base station, wherein the first slot precedes the second slot in transmission, and wherein the coding scheme selected by the user equipment for use in the second slot is different from a coding scheme used for downlink transmission to the user equipment in the first slot.

29. The computer-readable medium of claim 28, and further comprising code for causing a computer to:
  measure signal-to-noise ratio in the channel;
  transmit the signal-to-noise ratio in channel quality indication feedback to the second wireless communication apparatus; and
  receive from the second wireless communication apparatus an indicator identifying the selected code book in a plurality of code books maintained by the first wireless communication apparatus for use when signals are iteratively processed, wherein the selected code book is selected based on the signal-to-noise ratio.

30. The computer-readable medium of claim 23, wherein the first wireless communication apparatus is configured for iteratively processing signals when a decoder in the receiver provides a feedback signal to the demapper.

* * * * *